W. F. NICHOLAS.
COMBINED SCALE AND WRITING INSTRUMENT.
APPLICATION FILED AUG. 18, 1911.
1,025,586.
Patented May 7, 1912.
2 SHEETS—SHEET 2.
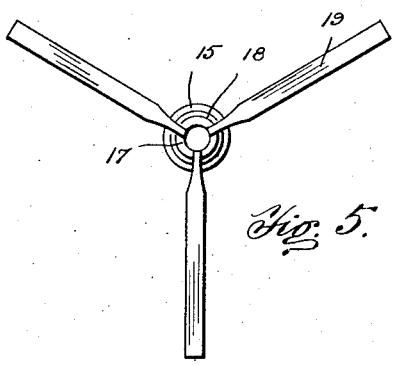
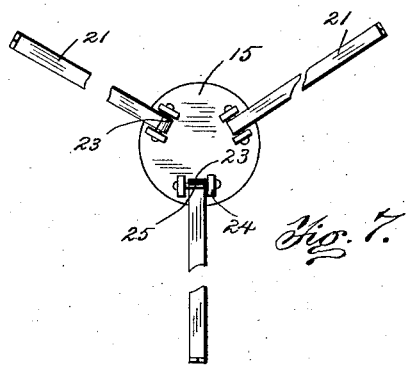
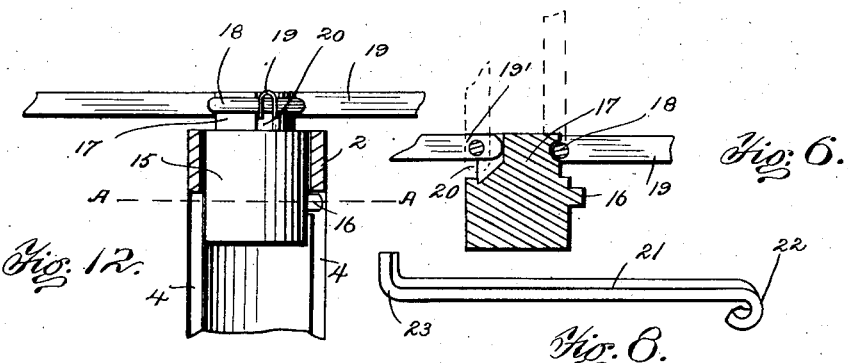
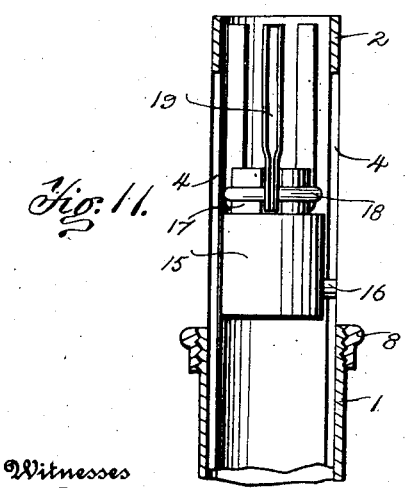
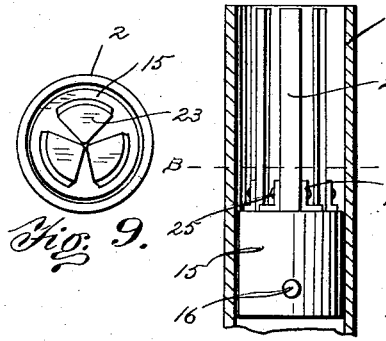

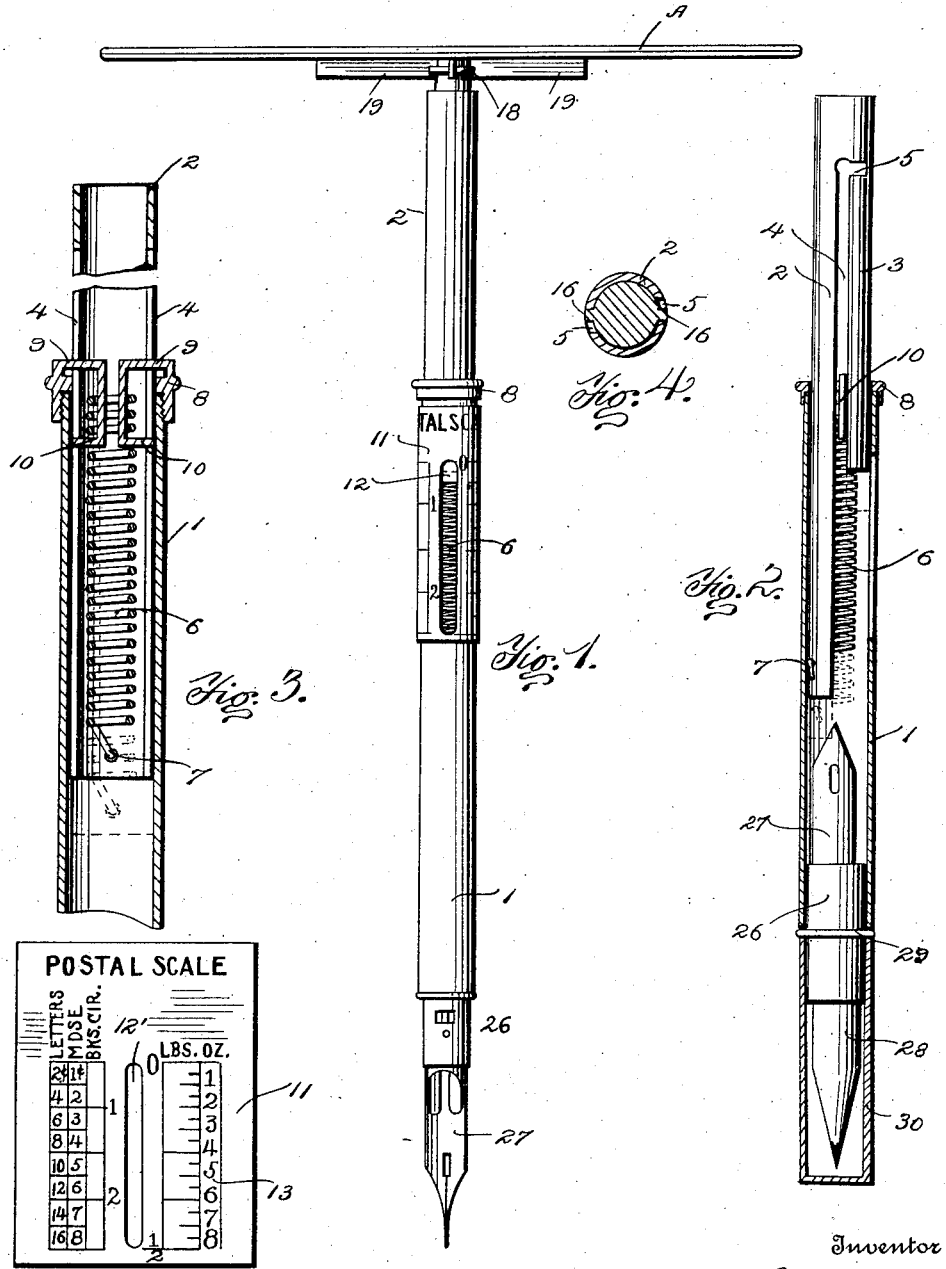

UNITED STATES PATENT OFFICE.

WILLIAM F. NICHOLAS, OF CHICAGO, ILLINOIS.

COMBINED SCALE AND WRITING INSTRUMENT.

1,025,586. Specification of Letters Patent. Patented May 7, 1912.

Application filed August 18, 1911. Serial No. 644,870.

*To all whom it may concern:*

Be it known that I, WILLIAM F. NICHOLAS, a citizen of the United States, residing at Chicago, in the county of Cook and State of Illinois, have invented certain new and useful Improvements in Combined Scales and Writing Instruments, of which the following is a specification.

This invention relates to a combined scale and writing instrument and more specifically to a pocket scale contained in a relatively narrow casing that will compactly hold at one end a spring-controlled scale and at the opposite end a pen and pencil holder. To this end I have provided a letter scale completely held in a tubular casing the various parts of which may be normally concealed therein and readily arranged in operative position, in combination with a postal scale suitably encircled around said casing with which an indicator coöperates actuated by said scale, and a pen and pencil holder removably mounted at the free end of the casing. As thus constructed the device presents an attractive, inexpensive and efficient device which may be carried in the pocket with the relative lightness of a pencil.

With these and other advantages in view my invention comprises the combination, arrangement, and details of construction shown clearly in the drawings and then more particularly pointed out in the appended claims.

Similar reference characters indicate similar parts in the respective views in the drawings.

Figure 1 is a vertical elevation of my device showing the parts in operative position, the scale being actuated, and the pen ready for use; Fig. 2 is a vertical elevation, partly in section disclosing the interior arrangement of my device, and the pencil ready for use; Fig. 3 is a detail sectional view of the spring responsive to the load deposited on the scale; Fig. 4 is a transverse sectional view on the line A—A of Fig. 12; Fig. 5 is a detail view of the fingers receiving the letters or package to be weighed; Fig. 6 is a sectional detail view of the slider on which the fingers are movably mounted; Fig. 7 is a detail view of a modification of the fingers. Fig. 8 is a detail perspective view of one of the modified fingers; Fig. 9 is a transverse view of the fingers on the line B—B of Fig. 10, the fingers shown folded and the slider held in the casing; Fig. 10 is a sectional view of the casing showing the slider held in said casing and carrying one form of fingers; Fig. 11 is a similar view but showing a different form of fingers; Fig. 12 is a sectional detail view of the casing shown in Figs. 10 and 11 showing the slider held in the recess confining it in operative position; and Fig. 13 is a vertical elevation of the postal scale blank suitably adapted to encircle the casing.

A casing or tubular hollow member 1 serves as the body portion of my device to which are removably fitted at each end one of the accessories of my device. The scale works in a tubular member 2 which telescopes snugly in the casing 1 and is formed at diametrically opposite sides with elongated slots 4 having between them the concave surface 3 which, as shown in Fig. 2 is shorter in length than the tubular body of which it forms an integral part. Each slot 4 is formed at 5 with a terminal recess for a purpose to be stated.

The casing 1 carries a retractile spring 6 secured at one end to it at 7 and yielding against the inward movement of the scale-carrier 2. A cap 8 is snugly fitted to the mouth of the casing immediately above the spring and is secured to the tubular carrier 2, and it serves to guide said member as it slides in casing 1; for this purpose cap 8 is formed with offsets 9 which each comprises a flat upper surface guided in the slot 4 and a downwardly-extending leg disposed in the core of spring 6 and having a projecting branch 10 stepped out of the plane of said spring, as shown in Fig. 3.

The casing 1 has an elongated slot 12 through which is exposed in the capacity of an indicator the relatively short part 3 of the scale carrier 2. An indicating metallic or fibrous sheet 11 has a corresponding slot 12', shown in Fig. 13, which registers therewith when said sheet is wound around the casing 1, shown in Fig. 1. This indicating sheet is suitably marked with the desirable information necessary to the utility of the device and under a heading "Postal scale" are set apart contiguous to the slot 12' two indicating columns 13 and 14, one designating as shown, the weight of the letters, merchandise, books, circulars, etc., placed on the scale in pounds or ounces, and the other marked with such classified designations. As the scale carrier 2 is caused to descend in the casing the pointer formed by part 3 thereof will aline with any of the horizontal markings on the postal scale and thereby indicate the weight and postal charge.

The scale carrier 2 is actuated by the member 15 provided with foldable fingers upon which the letter or package to be weighed will be placed. The member 15 fits securely in the carrier 2 and is formed with oppositely-arranged lugs or stops 16 shown in Fig. 4 which are slidably guided in the slots 4 to active and inactive position. In active position these lugs will engage the recesses 5 in the carrier 2 and will be held thus in elevated position causing the fingers 19 or 21 to project through the mouth of said carrier. Two forms of fingers are shown in Figs. 5 and 7 which are differently but foldably mounted upon a boss 17 formed upon the member 15. As shown in Fig. 6 the boss 17 receives the inner end of the flat face finger 19 in foldable relation by suitable means, which comprise, as one mode of attachment, a ring or strip 18 encircling said boss and bridging a plurality of recesses 20, one for each finger, formed in said boss; the fingers 19 are pivoted to said ring 18 and project therefrom to form rotund surfaces 19′ frictionally impinging against the wall of said recess to lie in a horizontal plane but readily folded or turned to an upright position indicated in dotted lines, Fig. 6, thereby subserving the end of ready inclosure in the carrier 2. In Figs. 7 and 8 the fingers 21 are formed with a pointed offset 23 at one end, and at the other with a pintle or hook offset 22 engaged by a pintle 24 tapped through lugs 25 suitably mounted upon the base 15, the fingers being of due thickness to rise above the lugs when in horizontal position, as shown in Fig. 7. The office of the pointed offset is to more efficiently engage the letter or article placed thereupon. A holder 26 is shown in Fig. 2 carrying a pen 27 at one end, a pencil 28 at the other and a flange stop 29 serving to operatively hold either writing surface in position, in the conventional manner.

The simple mode of operation of the device will be readily understood. Normally the holder 26 will be concealed by the conventional closure 30 snugly fitting its projecting part, said holder being easily removable. The fingers carried by member 15 will be folded in upright position and said member slid in the scale carrier 2 guided against rotation by the interengagement of the lugs 16 and oppositely-arranged slots 4, and it will then be concealed as shown in Figs. 10 and 11. To use the scale the member 15 will be moved upwardly until lugs 16 are free to enter the recesses 5, whereupon the fingers may be distended as shown in Figs. 5, 7, and 1 ready to receive an article A shown in Fig. 1. It is obvious that the load thus deposited will urge the resiliently mounted telescoping member 2 downwardly, the joint between the casing 1 and said member being formed by the ferrule 8′ carried by said member. The short portion 3 of the member 2 will thereupon be depressed against the tension of the spring 6 and being exposed through the slots 12 and 12′ in said casing will impart the desired designation. It will be noticed that the spring 6 is engaged by member 2 through the medium of the stepped portion 10 formed upon the cap 8 aforesaid, the said member being desirably guided through the medium of its slots 4 engaged by the horizontal surfaces of the offsets 9 of said cap.

Numerous modifications may be resorted to in practice from the details of construction shown without departing in spirit from my invention.

What I claim to be new is:

1. A combined scale and pencil holder consisting of a tubular casing having a slot therein, a spring seated within said casing, a plunger over said spring and means for holding material to be weighed on said plunger, said means consisting of a support having a lug thereon adapted to engage said slot, arms pivoted to said support adapted to maintain a horizontal position and form said holding means said arms adapted to assume a vertical position.

2. A combined scale and pencil holder consisting of a tubular casing having a slot therein, a spring seated within said casing, a plunger over said spring and means for holding material to be weighed on said plunger, said means consisting of pivoted arms adapted to be held at either a vertical or horizontal position.

3. A combined scale and pencil holder consisting of a tubular casing having a slot therein, a spring seated within said casing, a plunger over said spring and means for holding material to be weighed on said plunger, said means consisting of pivoted arms adapted to be held at either a vertical or horizontal position, said arms when held in a vertical position adapted to form a tubular member.

In testimony whereof I affix my signature in presence of two witnesses.

WILLIAM F. NICHOLAS.

Witnesses:
  M. Purkowitch,
  Saul Elenbogen.

---

Copies of this patent may be obtained for five cents each, by addressing the "Commissioner of Patents, Washington, D. C."